(12) United States Patent
Muraoka

(10) Patent No.: US 6,185,301 B1
(45) Date of Patent: Feb. 6, 2001

(54) ECHO CANCELER HAVING PLURALITY OF ADAPTIVE FILTER CIRCUITS

(75) Inventor: Shinya Muraoka, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/033,157

(22) Filed: Mar. 2, 1998

(30) Foreign Application Priority Data

Feb. 28, 1997 (JP) .................................................. 9-060192

(51) Int. Cl.$^7$ .................................................. H04B 3/23
(52) U.S. Cl. ........................................... 379/410; 370/290
(58) Field of Search .................... 379/406, 410, 379/411; 381/71.1; 370/286, 289, 290

(56) References Cited

U.S. PATENT DOCUMENTS

| | | | | |
|---|---|---|---|---|
| 4,554,417 | * | 11/1985 | Boyer ..................... | 370/290 |
| 5,263,020 | * | 11/1993 | Yatsuzuka et al. ..................... | 379/410 |
| 5,313,498 | * | 5/1994 | Sano ..................... | 379/410 |
| 5,463,618 | * | 10/1995 | Furukawa et al. ..................... | 379/410 |
| 5,535,149 | | 7/1996 | Mori et al. . | |
| 5,610,909 | * | 3/1997 | Shaw ..................... | 379/410 |
| 5,644,596 | * | 7/1997 | Sih ..................... | 370/290 |
| 5,748,725 | * | 5/1998 | Kubo ..................... | 379/410 |
| 5,828,589 | | 10/1998 | Degenhardt . | |
| 5,859,914 | * | 1/1999 | Ono et al. ..................... | 379/410 |
| 5,867,486 | * | 2/1999 | Sugiyama ..................... | 370/290 |
| 5,937,060 | * | 8/1999 | Oh ..................... | 379/410 |
| 5,960,077 | * | 9/1999 | Ishii et al. ..................... | 379/410 |
| 5,978,473 | * | 11/1999 | Rasmusson ..................... | 379/410 |
| 5,999,828 | * | 12/1999 | Sih et al. ..................... | 379/410 |
| 6,009,083 | * | 12/1999 | Flanagan et al. ..................... | 379/411 |

FOREIGN PATENT DOCUMENTS 195 06 324 10/1995 (DE) .
0 508 847 10/1992 (EP) .

OTHER PUBLICATIONS

Patent Abstracts of Japan, "Control System For Voice Switch Used Jointly With Echo Canceler", 0534210 (Dec. 14, 1993), Abstract of Igai Kazunori, 07170337, (Jul. 4, 1995).

* cited by examiner

Primary Examiner—David R. Hudspeth
Assistant Examiner—Martin Lerner
(74) Attorney, Agent, or Firm—Foley & Lardner

(57) ABSTRACT

In an echo canceler, a first adaptive filter circuit calculates first tap coefficients using a first convergence coefficient, and generates a first pseudo echo signal, and a first subtracter subtracts the first pseudo echo signal from a transmitting signal to generate a first error signal. A second adaptive filter circuit calculates second tap coefficients using a second convergence coefficient, and generates a second pseudo echo signal, and a second substrate subtracts the second pseudo echo signal from the transmitting signal to generate a second error signal. A control circuit selects one set of the first tap coefficients and the second tap coefficients in accordance with a received signal, the transmitting signal, and the first and second error signals. A third adaptive filter circuit generates a third pseudo echo signal in accordance with the set of tap coefficients selected by the control circuit and the received signal, and a third subtracter subtracts the third pseudo echo signal from the transmitting signal to generate a third error signal.

10 Claims, 6 Drawing Sheets

ECHO CANCELER HAVING PLURALITY OF ADAPTIVE FILTER CIRCUITS

BACKGROUND OF THE INVENTION

1. Field of the Invention

The present invention relates to an echo canceler for eliminating the echoes generated at a proximal end of a transmission line of a telecommunication system through which speakers at the opposite ends of the line can talk to each other.

2. Description of the Related Art

In a prior art echo canceler, a single adaptive filter circuit and a single subtractor are provided. That is, in this adaptive filter circuit, tap coefficients are calculated in accordance with an error signal and a received signal, and a pseudo echo signal is generated in accordance with the tap coefficients and the received signal. Also, the subtracter subtracts the pseudo echo signal from a transmitting signal, thus cancelling echoes in the transmitting signal. In the prior art echo canceler, however, when the background noise is large at the proximal end of a line or when it is impossible to determine whether the line is for a 2-wire system or a 4-wire system, the characteristics of detecting double-talk are degraded, and the characteristics of tap coefficients are not stable. This will be explained later in detail.

SUMMARY OF THE INVENTION

It is an object of the present invention to provide an echo canceler that can stably provide excellent characteristics of tap coefficients without degrading the characteristics of detecting double-talk, even when the background noise is large at the proximal end of the line or when it is impossible to determine if the line is for a 2-wire system or a 4-wire system.

According to the present invention, in an echo canceler, a first adaptive filter circuit calculates first tap coefficients using a first convergence coefficient, and generates a first pseudo echo signal, and a first subtracter subtracts the first pseudo echo signal from a transmitting signal to generate a first error signal. A second adaptive filter circuit calculates second tap coefficients using a second convergence coefficient, and generates a second pseudo echo signal, and a second subtracter subtracts the second pseudo echo signal from the transmitting signal to generate a second error signal. A control circuit selects one set of the first tap coefficients and the second tap coefficients in accordance with a received signal, the transmitting signal, and the first and second error signals. A third adaptive filter circuit generates a third pseudo echo signal in accordance with the set of tap coefficients selected by the control circuit and the received signal, and a third subtracter subtracts the third pseudo echo signal from the transmitting signal to generate a third error signal serving as an actual transmitting signal.

In this echo canceler, the first and second filter circuits are constantly operating for tap estimation regardless of the operation of the control circuit.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENT

Before the description of the preferred embodiment, prior art echo cancelers will be explained with reference to FIGS. 1, 2, 3 and 4.

Figure 1:
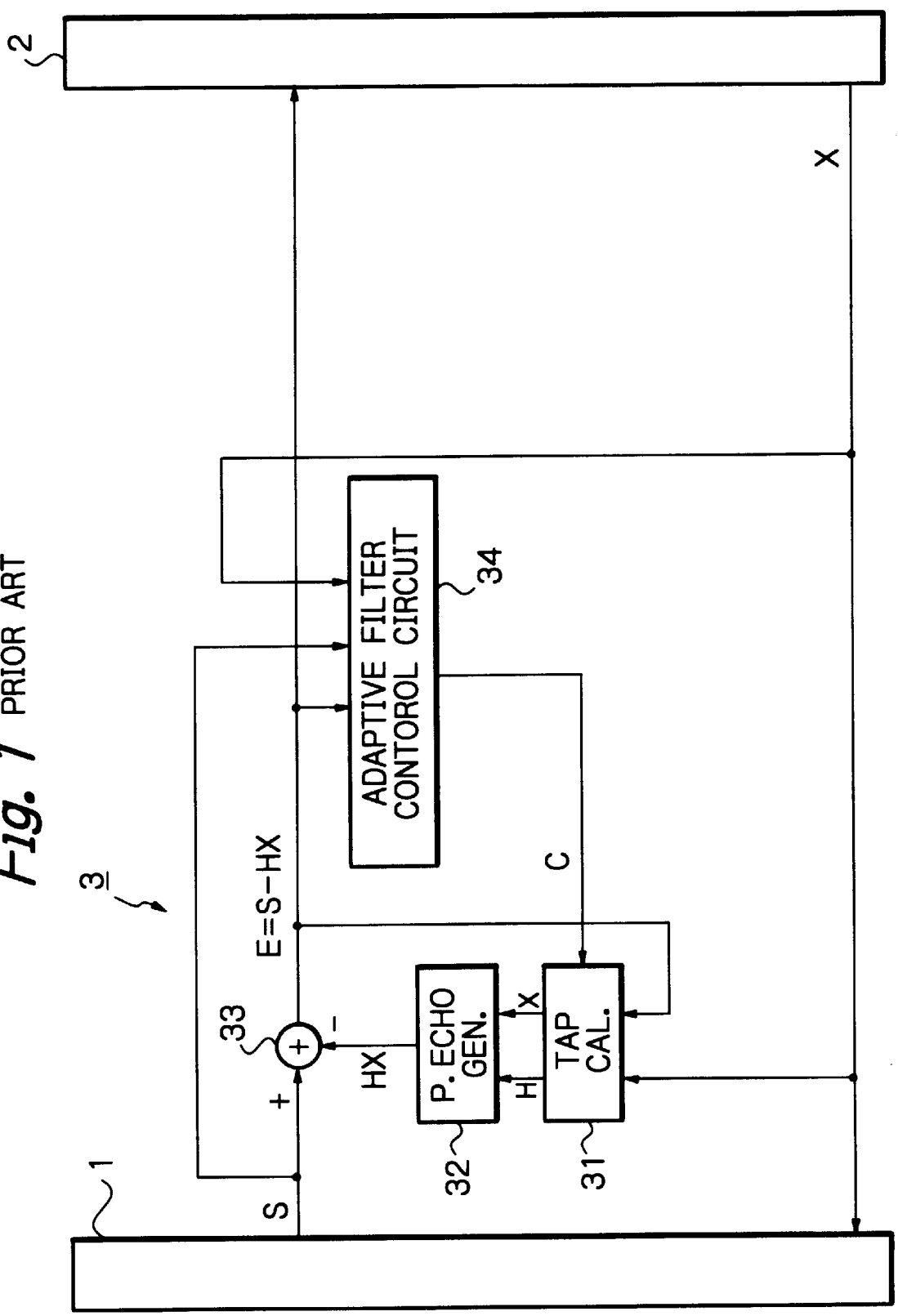
FIG. 1 is a block circuit diagram illustrating a first prior art echo canceler.

In FIG. 1, which illustrates a first prior art echo canceler, a line 1 is connected to a telephone set to be used by a proximal end speaker, and a line 2 is connected to a modem for a distal end speaker. As a result, the proximal end speaker and the distal end speaker can exchange voice signals by way of the lines 1 and 2. Hereinafter, a voice signal proceeding from the line 1 to the line 2 is referred as a transmitting signal S, and a voice signal proceeding from the line 2 to the line 1 is referred to as a received signal X.

An echo canceler 3 is provided between the lines 1 and 2, particularly, on the side of the line 1. The received signal X is subjected to a digital/analog (D/A) conversion on the line 1 and also to a 4-wire/2-wire conversion before outputting to the proximal end speaker. The voice being transmitted from the proximal end speaker is subjected to a 2-wire/4-wire conversion and an A/D conversion before outputting to the echo canceler 3. That is, the transmitting signal S is a linear digital signal or a pulse code modulation (PCM) signal.

The echo canceler 3 is normally designed to suppress the voice (echo) being received that is leaking to the line 1 through which the voice being transmitted is travelling at the time of a 2-wire/4-wire conversion on the line 1. The echo canceler 3 is formed by a tap coefficient calculating circuit 31, a pseudo echo generating circuit 32, a subtracter 33 and an adaptive filter control circuit 34. Note that the tap coefficient calculating circuit 31 and the pseudo echo generating circuit 32 form an adaptive filter circuit.

The transmitting signal S can be represented by the formula (1):

$$S = A + B \qquad (1)$$

Where A is the voice spoken by the proximal end speaker and the background noise, and B is the echo generated at the 2-wire/4-wire conversion in the line 1.

The subtracter 33 subtracts a pseudo echo signal HX from the transmitting signal S by the formula (2) to obtain an error signal E:

$$E = S - HX \qquad (2)$$

The pseudo echo signal HX is generated from the pseudo echo generating circuit 32. If the voice generated from the proximal end speaker is very small and the tap coefficients of the tap coefficient calculating circuit 31 are converged E≈0. In this case, if the proximal end speaker is not silent, E≈A.

The pseudo echo signal HK for each signal symbol is calculated by the pseudo echo calculating circuit 32 using the formula (3)

$$HX = \sum_{i=1}^{N} H_i \cdot X_{(N-i)} \tag{3}$$

Where $H_i$ is an i-th tap coefficient; and
$X_{(N-i)}$ is a received signal symbol at (N−i) time before the current time.

For example, $X_0$ denotes the current symbol of the received signal X, $X_1$ denotes a symbol of the received signal X which precedes the current symbol by one symbol, ..., and $X_N$ denotes a symbol of the received signal X which precedes the current symbol by N symbols.

The tap coefficient calculating circuit 31 has N taps and N tap coefficients $H_i$ (i=1, 2, ..., N). For this purpose, the tap coefficient calculating circuit 31 includes N tap memories for storing the tap coefficients and an N-stage shift register for shifting the received signal X. The received signal X is input to the tap coefficient calculating circuit 31 to update the tap coefficients $H_i$ (i=1, 2, ..., N) for each symbol. That is, a new tap coefficient $H_i'$ for the current tap coefficient $H_i$ is estimated by the following formula (4):

$$H_i' = H_i + \mu \cdot E_i \cdot X_i - i/\alpha \tag{4}$$

$$\alpha = \sum_{i=1}^{H} X_i / N$$

where i is a tap number (i=1, 2, ..., N);
$\mu$ is a convergence coefficient.

Note that the tap coefficient calculating circuit 31 also includes a multiplexer, an adder, a subtracter and a control circuit therefor, in order to carry out the formula (4). Thus, the tap coefficients $H_i$ are usually converged by the tap coefficient calculating circuit 31, so that the error signal E is brought close to zero. In this case, the larger the convergence coefficient $\mu$, the larger the convergence speed.

The tap estimation using the formula (4) should be carried out only when the received signal X shows a sufficiently high level and the echo component due to the received signal X is much larger than the voice of the proximal end speaker or the background noise in the transmitting signal S. Otherwise, the operation of the tap estimation has to be suspended to avoid any degradation in the characteristics of tap coefficients. In this case, the last tap coefficients are maintained. The determination of whether or not the tap estimation operation is carried out is made by the adaptive filter control circuit 34 which generates a control signal C and transmits it to the tap coefficient calculating circuit 31. Here, if C="1", the tap coefficient calculating circuit 31 is operated, while if C="0", the tap coefficient calculating circuit 31 is not operated.

The operation of the adaptive filter circuit circuit 34 of FIG. 1 is explained next with reference to FIG. 2.

Figure 2:
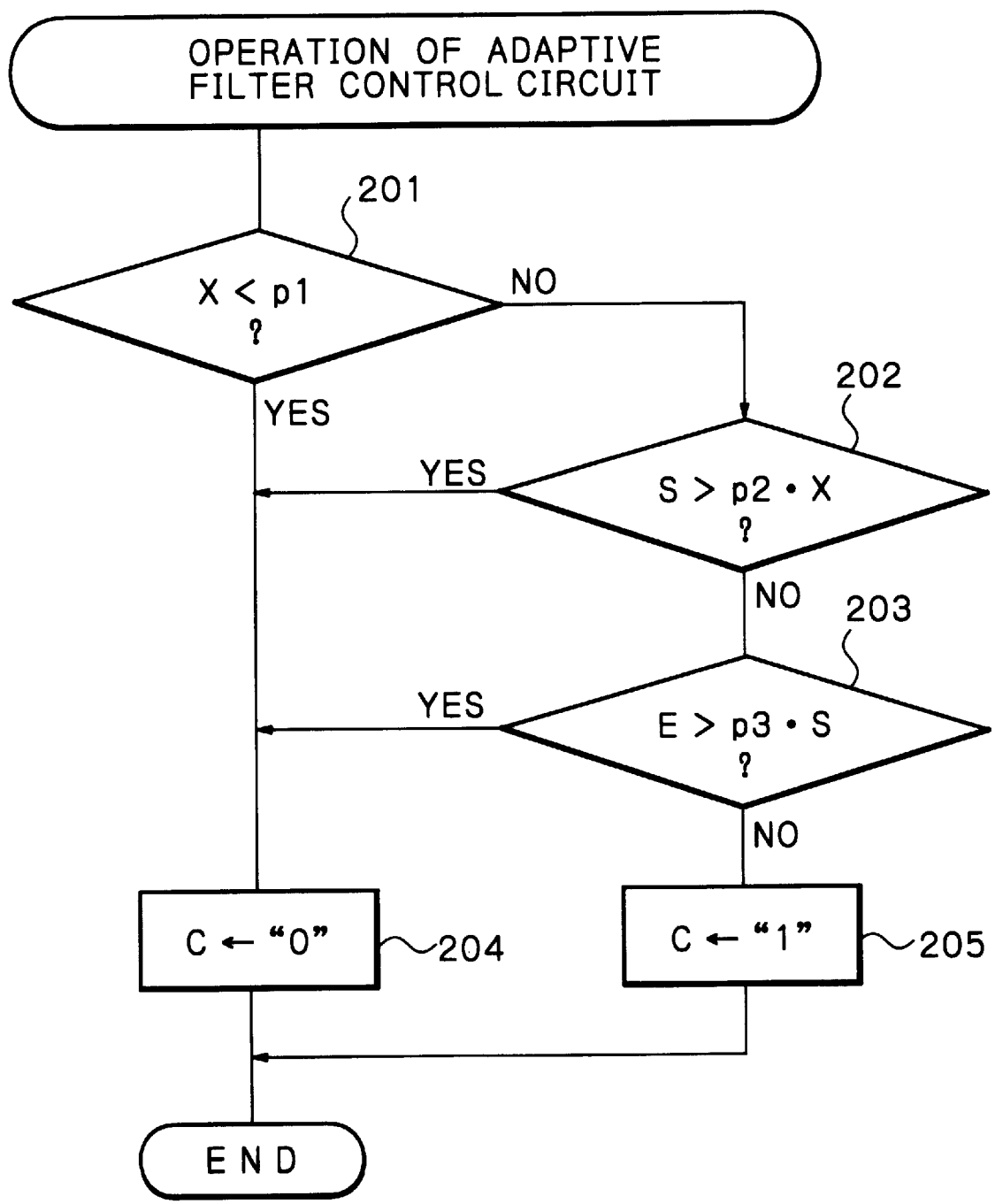
FIG. 2 is a flowchart showing the operation of the adaptive filter control circuit of FIG. 1.

The routine of FIG. 2 is carried out by receiving one symbol of the received signal X.

First, at step 201, it is determined whether or not the following formula (5) is satisfied:

$$X < p1 \tag{5}$$

where p1 is a constant. If X<p1, this means that the distal end speaker is recognized as silent. Therefore, the control proceeds to step 204 which causes the control signal C to be "0", so that the tap estimation operation is not carried out, Otherwise, the control proceeds to step 202.

At step 202, it is determined whether or not the following formula (6) is satisfied:

$$S > p2 \times X \tag{6}$$

where p2 is a constant not larger than 0.5. If S>p2×X, this means that the proximal end speaker and the distal end speaker are both recognized to be obviously talking. This is a so-called double-talk state. Therefore, the control proceeds to step 204 which causes the control signal C to be "0", so that the tap estimation operation is not carried out, Otherwise, the control proceeds to step 203.

At step 203, it is determined whether or not the following formula (7) is satisfied:

$$E > p3 \times S \tag{7}$$

where p3 is a constant. This means that an echo suppression amount (S/E) of the echo canceler 3 is so small that the voice component other than the echo takes a large proportion in the transmitting signal S. Therefore, in order to avoid any degradation in the characteristics of tap coefficients, the control proceeds to step 204 which causes the control signal C to be "0", so that the tap estimation operation is not carried out, Otherwise, the control proceeds to step 205 which causes the control signal C to be "1", so that the tap estimation operation is carried out.

The above-described first prior art echo canceler, however, accompanied by the following problems.

At step 202, the constant p2 is required to be accurately defined by the line 1. Also, when the level of the received signal X is higher than that of the transmitting signal S, it is difficult to detect any double-talk state. Contrary to this, if a smaller value is selected for the constant p2 in order to alleviate this problem, a double-talk state with be erroneously detected when the echo level is raised. In addition, even if the formula (6) at step 202 is satisfied, when a background noise occurs at the side of the proximal end speaker, a double-talk state will also be erroneously detected.

Also, at step 203, if a double-talk state is correctly discriminated from a state where the tap coefficients are converging, a single-talk state will be mistaken for a double-talk state, so that the tap coefficients will stop converging.

Additionally, if a 4-wire telephone set is linked to the line 1 for some reason or another, acoustic coupling can take place between the generated echo and the telephone set, and such coupling may be a non-linear response, and in this case, the response level of the echo may be low. Therefore, if an echo suppression amount E/S represented by the formula (7) is used, this amount may be rather small and/or unstable, and hence, this amount cannot adequately be used for any determination.

Further, when the response level of the echo of the line 2 is very low, when no echo takes place by connecting a 4-wire telephone set to the line 2, or when a non-linear echo exists, the echo suppression amount becomes small, so that a double-talk state may erroneously be detected.

Figure 3:
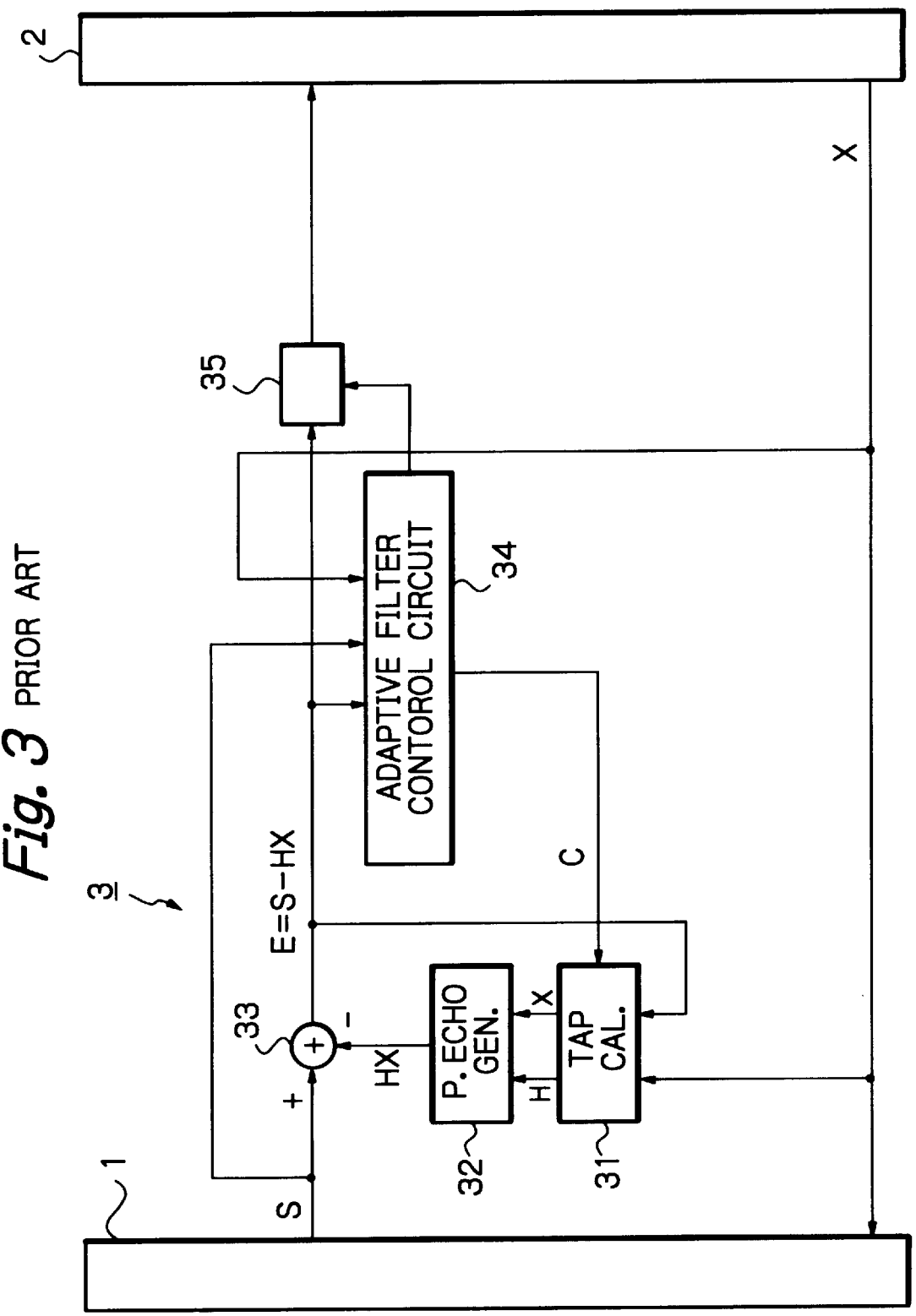
FIG. 3 is a block circuit diagram illustrating a second prior art echo canceler.

In FIG. 3, which illustrates a second prior art echo canceler (see: JP-A-7-170337), a variable attenuator 35 is added to the elements of FIG. 1, thus suppressing residual echo by turning ON and OFF the variable attenuator 35 without being affected by the delay of an echo path.

Figure 4:
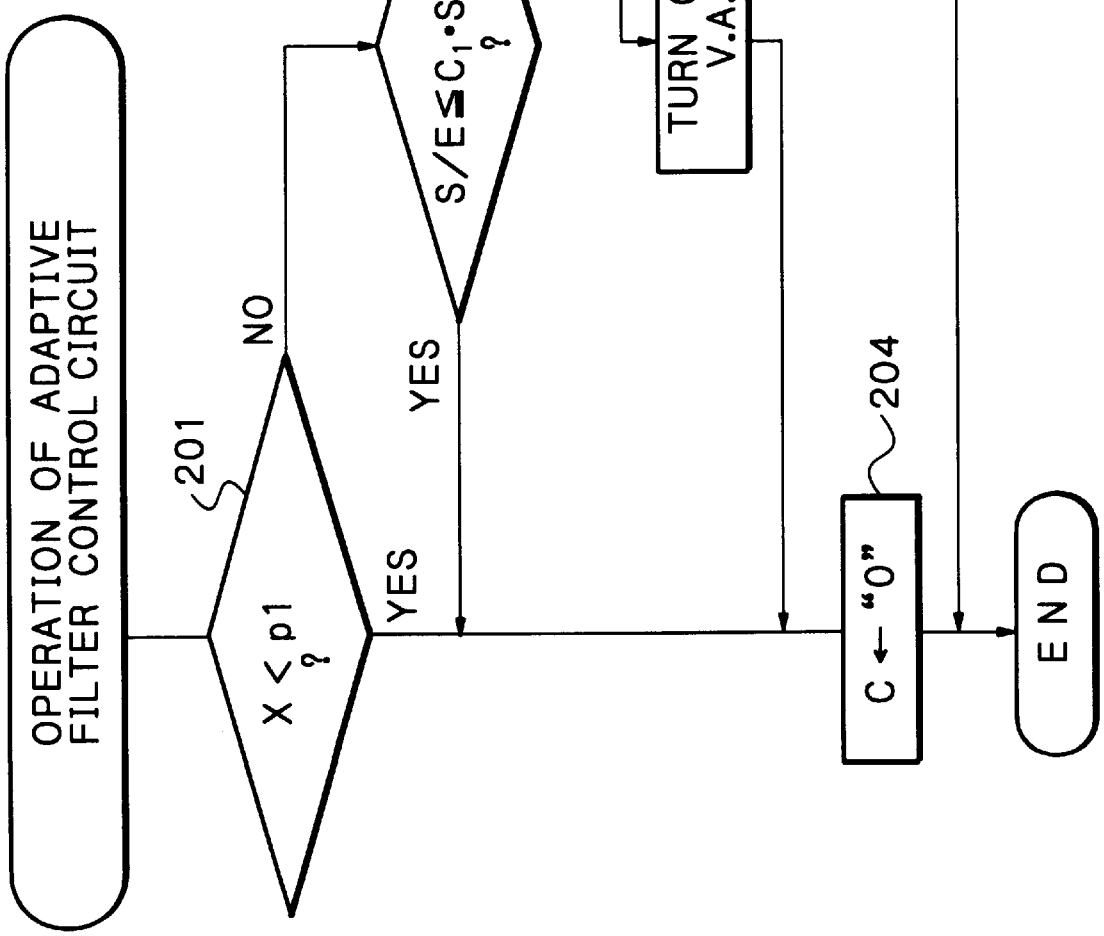
FIG. 4 is a flowchart showing the operation of the adaptive filter control circuit of FIG. 3.

The operation of the adaptive filter control circuit 35 of FIG. 3 is explained next with reference to FIG. 4. In FIG. 4, steps 401, 402 and 403 are provided instead of steps 202 and 203 of FIG. 2. That is, only if the determination at step 201 is negative, does the control proceed to steps 401, 402 and 403.

At step 401, it is determined whether or not the following formula (8) is satisfied:

$$S/E \leq C_1 \cdot (SM/EM) \quad (8)$$

Also, at step 402, it is determined whether or not the following formula (9) is satisfied:

$$S/E \leq C_2 \cdot (SM/EM) \quad (9)$$

In the formulae (8) and (9), $C_1$ and $C_2$ are constants having a relationship such that $$0 < C_1 < C_2 < 1$$

For example, $C_1 = \frac{1}{4}$ and $C_2 = \frac{1}{2}$. Also, SM and EM represent the average power of the transmitting signal S and the average value of the subtracter 33, respectively, when only the distal end speaker is talking so that the tap coefficients have been converged sufficiently in a single-talk state. Note that S and M of the formula (8) and (9) at steps 401 and 402 represent the current average power of the transmitting signal S and the current output value of the subtracter 33, respectively.

If $S/E \leq C_1 \cdot (SM/EM)$, this means that a complete double-talk state is realized. Therefore, the control proceeds to step 204 which causes the control signal C to be "0", so that the tap estimation operation is not carried out.

If $C_1 \cdot (SM/EM) < S/E \leq C_2 \cdot (SM/EM)$, this means that an intermediate state between a double-talk state and a single-talk state exists. Therefore, the control proceeds to step 403 which turns ON the variable attenuator 35, and then, proceeds to step 204.

If $S/E > C_2 \cdot (SM/EM)$, this means that a complete single-talk state is realized. Therefore, the control proceeds to step 205 which causes the control signal C to be "1", so that the tap estimation operation is carried out.

In the above-described second prior art echo canceler, when the background noise is large on the side of the proximal end speaker or the like, the value of SM/EM constantly shows a small value. Therefore, since the constants $C_1$ and $C_2$ are smaller than 1, the formulae (8) and (9) at steps 401 and 402 are constantly dissatisfied. As a result, the tap estimation operation is constantly carried out which degrades the characteristics of tap coefficients, which may diverge at worst.

Figure 5:
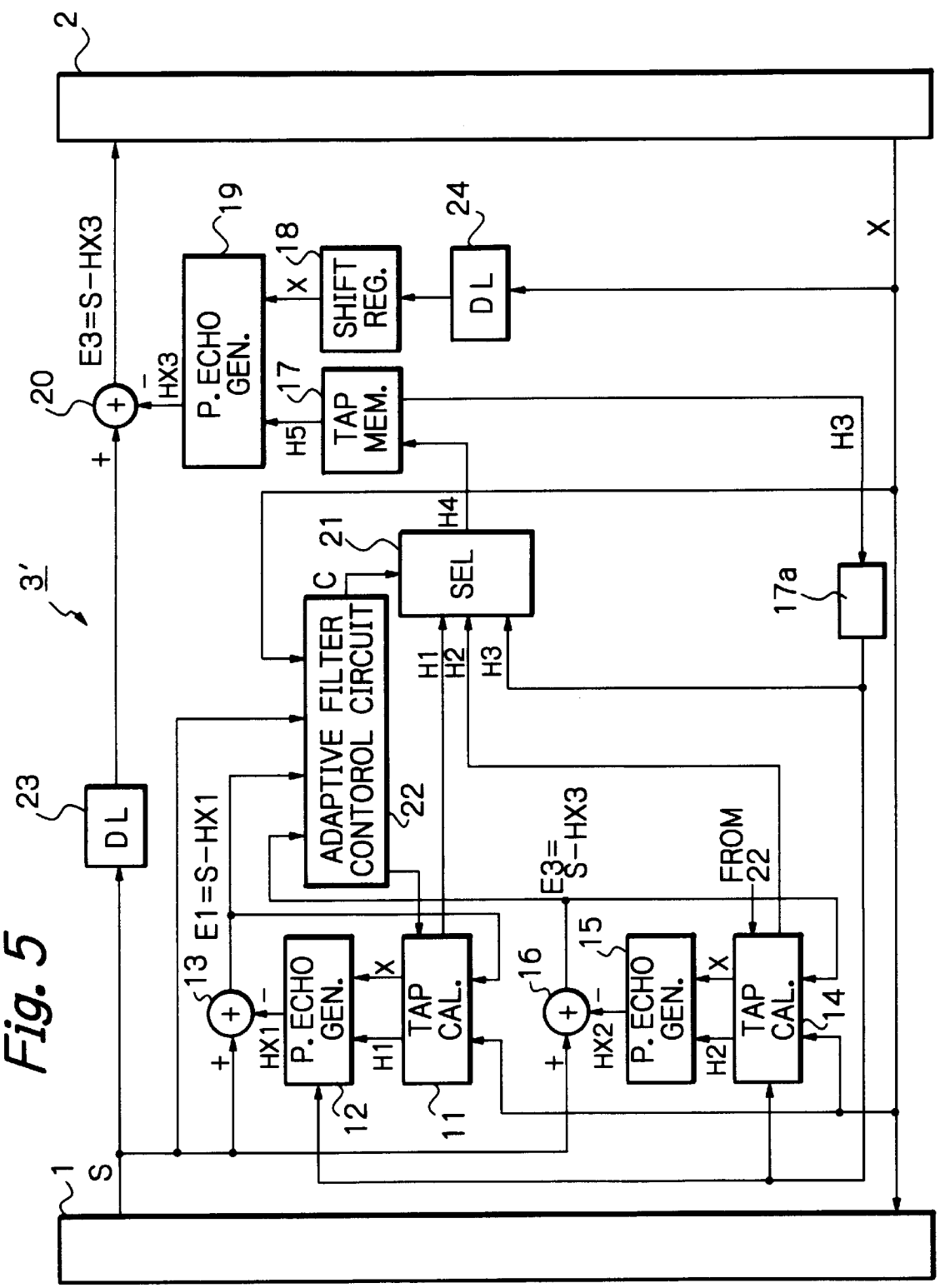
FIG. 5 is a block circuit diagram illustrating an embodiment and the echo canceler according to the present invention.

In FIG. 5, which illustrates an embodiment of the present invention, a canceler 3' includes three adaptive filter circuits.

The first adaptive filter circuit is formed by a tap coefficient calculating circuit 11 and a pseudo echo generating circuit 12 corresponding to the tap coefficient calculating circuit 31 and the pseudo echo generating circuit 32 of FIG. 1. A subtracter 13 corresponding to the subtracter 33 of FIG. 1 subtracts a pseudo echo signal HX1 from the transmitting signal S by a formula similar to the formula (2):

$$E1 = S - HX1$$

The second adaptive filter circuit is formed by a tap coefficient calculating circuit 14 and a pseudo echo generating circuit 15 corresponding to the tap coefficient calculating circuit 31 and the pseudo echo generating circuit 32 of FIG. 1. A subtracter 16 corresponding to the subtracter 33 of FIG. 1 subtracts a pseudo echo signal HX2 from the transmitting signal S by a formula similar to the formula (2):

$$E2 = S - HX2$$

In the first and second adaptive filter circuits, the pseudo echo signals HX1 and HX2 are calculated in the pseudo echo generating circuits 12 and 15, respectively, for each symbol using the formula (3), and the tap coefficients H1 and H2 are calculated in the tap coefficient calculating circuits 11 and 14, respectively, for each symbol using the formula (4). That is, the first adaptive filter circuit (11, 12) operates similarly as the second adaptive filter (14, 15), but the first and second adaptive filter circuits have convergence coefficients that are different from each other. The tap coefficient calculating circuit 11 uses $\mu1$ and the tap coefficient calculating circuit 13 uses $\mu2$, where $\mu1 > \mu2$. Thus, in a single-talk state where only the distal end speaker is talking, the first adaptive filter circuit (11, 12) shows a quick convergence to provide a relationship of Es<E2, whereas, in a case where the proximal end speaker starts talking and/or the background noise becomes large to degrade the characteristics of the tap coefficients, a relationship of E1>E2 appears because the characteristics of the tap coefficients are degraded slowly for the tap coefficient calculating circuit 14.

The third adaptive filter is formed by a tap coefficient memory 17, a N-stage shift register 18 and a pseudo echo generating circuit 19 corresponding to the pseudo echo generating circuit 33 of FIG. 1. A subtracter 20 corresponding to the subtracter 33 of FIG. 1 subtracts a pseudo echo signal HX3 from the transmitting signal by a formula similar to the formula (2):

$$E3 = S - HX3$$

In the third adaptive filter circuit, the pseudo echo signal HX3 is calculated in the pseudo echo generating circuit 19 for each symbol using the formula (3). However, in the third adaptive filter circuit, the tap coefficients are not calculated, but the tap coefficients are supplied from a filter selected 21 to the tap coefficient memory 17.

For every M symbols, the filter selector 21 receives tap coefficients H1 from the tap coefficient calculating circuit 11, tap coefficients H2 from the tap coefficient calculating circuit 14, and tap coefficients H3 from the tap coefficient memory 17. Note that the tap coefficients H3 are stored temporarily in the register 17a. Then, the filter selector 20 selects one of the three sets of tap coefficients as optimal tap coefficients H4 according to a control signal C provided by an adaptive filter control circuit 22 and transmits them to the tap coefficient memory 17.

The adaptive filter control circuit 21 receives the transmitting signal S from the line 1, the received signal X from the line 2, the error signal E1 from the subtracter 13, and the error signal E2 from the subtracter 16, and determines the state of transmission and reception and the state of the tap coefficients in the tap coefficient calculating circuits 11 and 14 by every M symbols.

The tap coefficient memory 17 constantly stores N tap coefficients and outputs them to the pseudo echo generating circuit 19 for each symbol. On the other hand, as stated above, the tap coefficients of the tap coefficient memory 17 are updated by every M symbols to make tap coefficients H4 be provided by the filter selector 20 as optimal tap coefficients during the next M symbols. In this case, the tap coefficients that have been stored in the tap coefficient memory 17 until the updating are outputted as the tap coefficients H3 to the filter selector 20.

Since the adaptive filter selector 20 and the adaptive filter control circuit 21 are operated for every M symbols, the pseudo echo generating circuit 19 and the subtracter 20 needs to be operated for a delayed transmitting signal and a delayed received signal. For this purpose, delay circuits 23 and 24 are provided. That is, the delay circuit 23 delays the transmitting signal S by M symbols and transmits it to the subtractor 20. Also, the delay circuit 24 delays the received signal X by M symbols and transmits it to the shift register 18.

The operation of the adaptive filter control circuit 22 of FIG. 5 is explained next with reference to FIG. 6.

Figure 6:
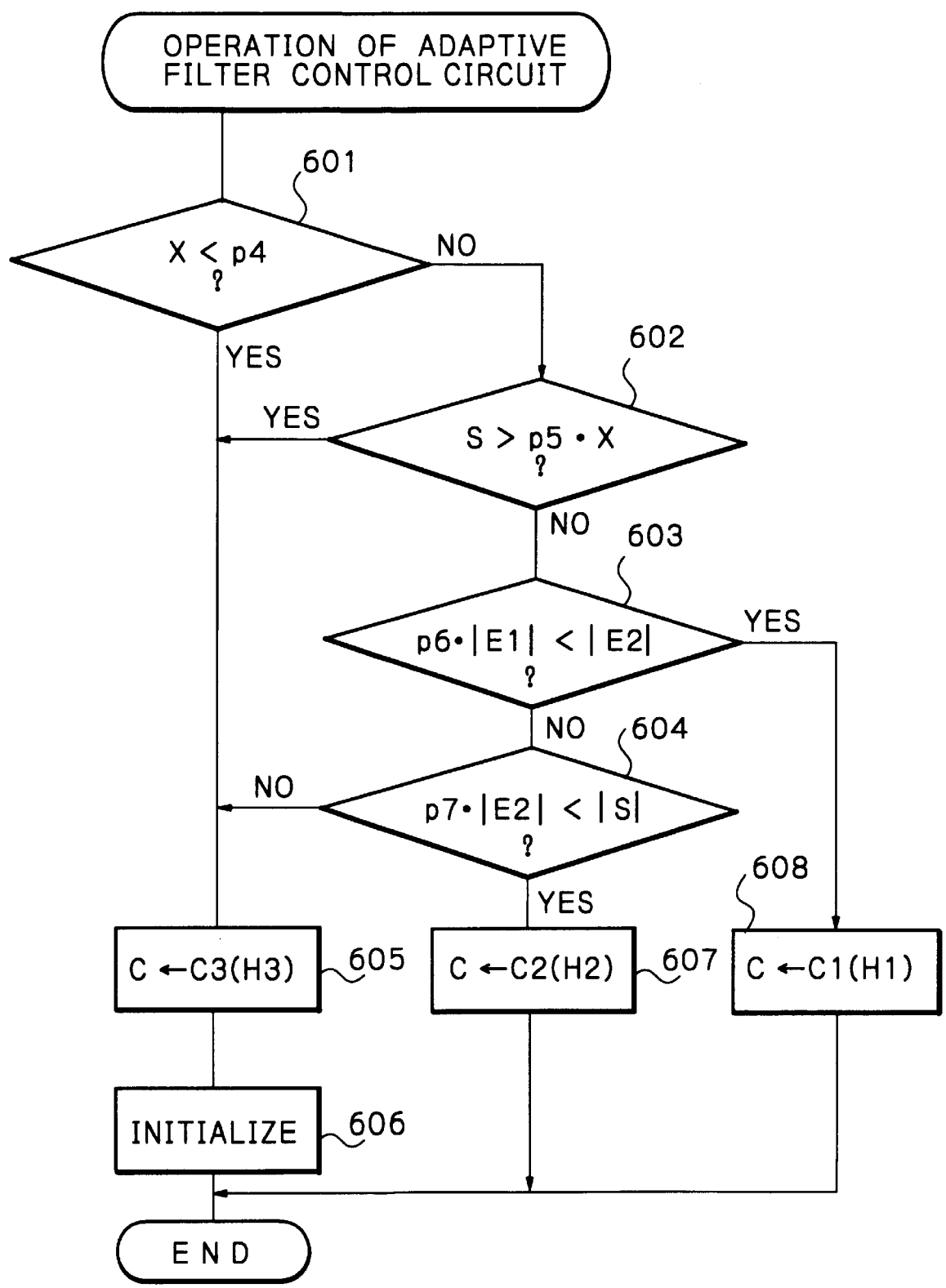
FIG. 6 is a flowchart showing the operation of the adaptive filter control circuit of FIG. 5.

The routine of FIG. 6 is carried out by receiving every M symbol of the received signal X.

First, at step 601, in the same way as in step 201 of FIG. 2, it is determined whether or not the following formula (10) is satisfied:

$$X < p4 \tag{10}$$

where p4 is a constant. If X<p4, this means that the distal end speaker is recognized as silent. Therefore, the control proceeds to step 605 which causes the control signal C to be C3 for selecting the tap coefficients H3. As a result, the tap coefficients H3 are again stored in the tap coefficient memory 17', in other words, the tap estimation operation is substantially stopped. Further, at step 606, the adaptive filter control circuit 22 initializes the tap coefficients of the tap coefficient calculating circuits 11 and 14 by using the tap coefficients H3. Otherwise, the control proceeds to step 602.

As step 602, it is determined whether or not the following formula (11) is satisfied:

$$S > p5 \cdot X \tag{11}$$

where p5 is a constant. Note that 0.5 can most appropriately be used for the constant p5. This is because the CCITT Standards provide that an echo signal should be at a level of 0.5 times of that of a received signal at most and the constant p5 should be exploited maximally in order to prevent a double-talk state from being erroneously detected due to the echo signal.

At step 602, if S>p5.X, this determines that a single-talk state of the proximal end speaker or a double-talk state is realized. Therefore, the control proceeds to step 605, so that the tap coefficients H3 are again stored in the tap coefficient memory 17. Also, at step 606, the tap coefficients of the tap coefficient calculating circuits 11 and 14 are initialized by using the tap coefficients H3. Otherwise, the control proceeds to step 603.

At step 603, it is determined whether or not the following formula (12) is satisfied:

$$p6 \cdot |E1| < |E2| \tag{12}$$

where p6 is a constant. If p6·|E1|<|E2|, this determines that a signal is currently being received, and the voice of the proximal end speaker and the background noise do not affect the tap estimation operation. Therefore, the control proceeds to step 608 which causes the control signal C to be C1 for selecting the tap coefficients H1. As a result, the tap coefficients H1 are stored in the tap coefficient memory 17. Otherwise, the control proceeds to step 604.

At step 604, it is determined whether or not the following formula (13) is satisfied:

$$p7 \cdot |E2| < |S| \tag{13}$$

where p7 is a constant. If p7·|E2|<|S|, this determines that the tap coefficients are fairly converged. Therefore, the control proceeds to step 607 which causes the control signal C to be C2 for selecting the tap coefficients H2. As a result, the tap coefficients H2 are stored in the tap coefficient memory 17. Otherwise, this determines that a voice is being received but the characteristics of the tap coefficients are being degraded by external disturbances (voice, background sound, etc.) on the side of the proximal end speaker. Therefore, the control proceeds to step 605 which causes the control signal C to be C3 for selecting the tap coefficients H3. As a result, the tap coefficients H3 are again stored in the tap coefficient memory 17. Also, at step 606, the tap coefficients of the tap coefficient calculating circuits 11 and 14 are initialized by using the tap coefficients H3.

As explained hereinabove, according to the presently invention, since the two adaptive filter circuits are constantly operating for the tap estimation, any deceleration in the convering rate and any suspension of convergence due to a wrong determination of a double-talk state can be effectively avoided.

Also, the current state of transmission and reception is not determined only by the levels of the transmitting signal and the received signal and the tap coefficients are estimated by means of two different convergence coefficients in the two adaptive filter circuits, so that the current state of transmission and reception is determined by determining whether the characteristics of tap coefficients are being improved or degraded. As a result, even when the background noise is large, the tap estimation operation can be carried out without degrading the characteristics of tap coefficients. Additionally, the need for accurately selecting parameters by means of the line is eliminated.

Further, a determination of a double-talk state can be made quickly and accurately for the above-mentioned reasons.

Moreover, even if a non-linear echo exists, the tap coefficients are converged, through somewhat slowly, so that echo can be suppressed to a certain extent.

What is claimed is:

1. An echo canceler comprising:
   a first adaptive filter circuit for receiving a receiving signal, calculating first tap coefficients using a first convergence coefficient, and generating a first pseudo echo signal in accordance with said first tap coefficients and said receiving signal;
   a first subtracter, connected said first adaptive filter circuit, for receiving a transmitting signal and subtracting said first pseudo echo signal from said transmitting signal to generate a first error signal;
   a second adaptive filter circuit for receiving said received signal, calculating second tap coefficients using a second convergence coefficient smaller than said first convergence coefficient, and generating a second pseudo echo signal in accordance with said second tap coefficients and said received signal;
   a second subtracter, connected to said second adaptive filter circuit, for receiving said transmitting signal and subtracting said second pseudo echo signal from said transmitting signal to generate a second error signal;

a control circuit, connected to said first and second adaptive filter circuits and said first and second subtractors, for selecting one set of said first tap coefficients and said second tap coefficients in accordance with said received signal, said transmitting signal, and said first and second error signals;

a third adaptive filter circuit, connected to said control circuit, for receiving said received signal and said transmitting signal and generating a third pseudo echo signal in accordance with the set of tap coefficients selected by said control circuit and said received signal; and a third subtractor, connected to said third adaptive filter circuit, for subtracting said third pseudo echo signal from said transmitting signal to generate a third error signal.

2. The echo canceller as set forth in claim 1, wherein said control circuit comprises:

means for determining whether or not an average power of said received signal is smaller than a first value;

means for determining whether or not a ratio of an average power of said transmitting signal to the average power of said received signal is larger than a second value;

means for determining whether or not a ratio of an average power of said first error signal to an average power of said second error signal is smaller than a third value;

means for determining whether or not a ratio of the average power of said second error signal to an average power of said transmitting signal is smaller than a fourth value;

means for selecting said first tap coefficients when the average power of said received signal is not smaller than said first value, the ratio of the average power of said transmitting signal to the average power of said received signal is not larger than said second value, and the ratio of the average power of said first error signal to the average power of said second error signal is smaller than said third value; and means for selecting said second tap coefficients when the average power of said received signal is not smaller than said first value, the ratio of the average power of said transmitting signal to the average power of said received signal is not larger than said second value, the ratio of the average power of said first error signal to the average power of said second error signal is not smaller than said third value, and the ratio of the average power of said second error signal to the average power of said transmitting signal is smaller than said fourth value.

3. The echo canceler as set forth in claim 2, wherein said control circuit comprises means for fixing said selected tap coefficients when the average power of said received signal is smaller than said first value, when the average power of said received signal is not smaller than said first value and the ratio of the average power of said transmitting signal to the average power of said received signal is larger than said second value, and when the average power of said received signal is not smaller than said first value, the ratio of the average power of said transmitting signal to the average power of said received signal is not larger than said second value, the ratio of the average power of said first error signal to the average power of said second error signal is not smaller than said third value, and the ratio of the average power of said second error signal to the average power of said transmitting signal is not smaller than said fourth value.

4. The echo canceler as set forth in claim 2, wherein said second value is 0.5

5. The echo canceler as set forth in claim 1, further comprising:

a first delay circuit connected to said third adaptive filter circuit, the received signal being supplied via said first delay circuit to said third adaptive filter circuit; and a second delay circuit connected to said third subtracter, the transmitting signal being supplied via said second delay circuit to said third subtracter.

6. An echo canceler comprising:

a first adaptive filter circuit for receiving a received signal, calculating first tap coefficients using a first convergence coefficient for each symbol of said received signal, and generating a first pseudo echo signal in accordance with said first tap coefficients and said received signal for each symbol of said received signal;

a first subtracter, connected to said first adaptive filter circuit, for receiving a transmitting signal and subtracting said first pseudo echo signal from said transmitting signal to generate a first error signal;

a second adaptive filter circuit for receiving said received signal, calculating second tap coefficients using a second convergence coefficient smaller than said first convergence coefficient for each symbol of said received signal, and generating a second pseudo echo signal in accordance with said second tap coefficients and said received signal for each symbol of said received signal;

a second subtracter, connected to said second adaptive filter circuit, for receiving said transmitting signal and subtracting said second pseudo echo signal from said transmitting signal to generate a second error signal;

a tap coefficient memory for storing third tap coefficients;

a shift register for storing said received signal;

a pseudo echo generating circuit, connected to said tap coefficient memory and said shift register, for generating a third pseudo echo signal in accordance with the tap coefficients stored in said tap coefficient memory and said received signal stored in said shift register;

a third subtracter, connected to said pseudo echo generating, for subtracting said third pseudo echo signal from said transmitting signal to generate a second error signal;

a selector, connected to said first and second adaptive filters and said tap coefficient memory, for selecting one set of said first, second tap coefficients and transmitting a selected set of said first, second and third tap coefficients to said tap coefficient memory; and a control circuit, connected to said first and second adaptive filter circuits and said first and second subtracters, for operating said selector in accordance with said received signal, said transmitting signal, and said first and second error signals for every M symbols of said received signal.

7. The echo canceler as set forth in claim 6, wherein said control circuit comprises:

means for determining whether or not an average power of said receiving signal is smaller than a first value;

means for determining whether or not a ratio of an average power of said transmitting signal to the average power of said received signal is larger than a second value;

means for determining whether or not a ratio of an average power of said first error signal to an average power of said second error signal is smaller than a third value;

means for determining whether or not a ratio of the average power of said second error similar to an average power of said transmitting signal is smaller than a fourth value;

means for causing said selector to select said first tap coefficients when the average power of said received signal is not smaller than said first value, the ratio of the average power of said transmitting signal to the average power of said received signal is not larger than said second value, and the ratio of the average power of said first error signal to the average power of said second error signal is smaller than said third value;

means for causing said selector to select said second tap coefficients when the average power of said received signal is not smaller than said first value, the ratio of the average power of said transmitting signal to the average power of said received signal is not larger than said second value, the ratio of the average power of said first error signal to the average power of said second error signal is not smaller than said third value, and the ratio of the average power of said second error signal to the average power of said transmitting signal is smaller than said fourth value; and means for causing said selector to select said third tap coefficients when the average power of said received signal is smaller than said first value, when the average power of said received signal is not smaller than said first value and the ratio of the average power of said transmitting signal to the average power of said received signal is larger than said second value, and when the average power of said received signal is not smaller than said first value, the ratio of the average power of said transmitting signal to the average power of said received signal is not larger than said second value, the ratio of the average power of said first error signal to the average power of said second error signal is not smaller than said third value, and the ratio of the average power of said second error signal to the average power of said transmitting signal is not smaller than said fourth value.

8. The echo canceler as set forth in claim 7, wherein said second value is 0.5.

9. The echo canceler as set forth in claim 7, wherein said control circuit further comprises means for initializing said first and second tap coefficients of said first and second adaptive filter circuits by said third tap coefficients when said selector is caused to select said third tap coefficient.

10. The echo canceler as set forth in claim 6, further comprising:

a first delayed circuit connected to said third adaptive filter circuit, the received signal being supplied via said first delay circuit to said third adaptive filter circuit; and a second delay circuit connected to said third subtracter, the transmitting signal being supplied via said second delay circuit to said third subtracter.

* * * * *